(12) United States Patent
Farcas

(10) Patent No.: US 8,608,226 B2
(45) Date of Patent: Dec. 17, 2013

(54) VEHICLE WITH DOORS FOR ACCESSING A STORAGE SPACE

(75) Inventor: Cristian Farcas, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/369,004

(22) Filed: Feb. 8, 2012
(Under 37 CFR 1.47)

(65) Prior Publication Data
US 2013/0200648 A1  Aug. 8, 2013

(51) Int. Cl.
*B60J 5/10* (2006.01)

(52) U.S. Cl.
USPC .................................. 296/146.8; 296/146.11

(58) Field of Classification Search
USPC ............... 296/146.8, 50, 146.11, 147, 186.3, 296/186.4, 202
See application file for complete search history.

(56) References Cited

U.S. PATENT DOCUMENTS

| | | |
|---|---|---|
| 1,876,660 A | 9/1932 | Giltsch et al. |
| 1,961,205 A | 6/1934 | de Vizcaya |
| 2,177,826 A | 10/1939 | Hansen |
| 2,566,578 A | 9/1951 | Minor |
| 2,781,226 A | 2/1957 | Tydon |
| 2,825,301 A | 3/1958 | Quist |
| 3,210,118 A | 10/1965 | Chieger |
| 3,211,493 A | 10/1965 | Mandel |
| 3,387,406 A | 6/1968 | Coker et al. |
| 3,400,974 A | 9/1968 | Gage |
| 3,558,184 A | 1/1971 | Plegat |
| 4,470,170 A | 9/1984 | Gerteis |
| 5,029,927 A | 7/1991 | Totani |
| 5,876,086 A | 3/1999 | Lagrou et al. |
| 6,070,932 A | 6/2000 | Lopez-Baquero et al. |
| 6,131,989 A * | 10/2000 | Montone et al. ........... 296/146.8 |
| 6,609,748 B1 | 8/2003 | Azzouz et al. |
| 6,681,448 B2 | 1/2004 | Liang |
| 7,377,563 B1 | 5/2008 | Demick |
| 7,469,948 B2 * | 12/2008 | Karuppaswamy ......... 296/26.08 |
| 7,832,790 B2 * | 11/2010 | Plavetich ................. 296/146.12 |
| 2008/0106058 A1 | 5/2008 | Demick |

FOREIGN PATENT DOCUMENTS

EP  1386767  2/2004

* cited by examiner

Primary Examiner — Joseph Pape
Assistant Examiner — Dana Ivey
(74) Attorney, Agent, or Firm — Parks IP Law LLC

(57) ABSTRACT

A vehicle with a door that provides an opening for more easily accessing a storage space and greater utility of a storage space. The door includes a portion of a side wall and a portion of a back wall and is hingedly connected to a side wall of the vehicle at a position that is offset from the back end of the vehicle.

20 Claims, 5 Drawing Sheets

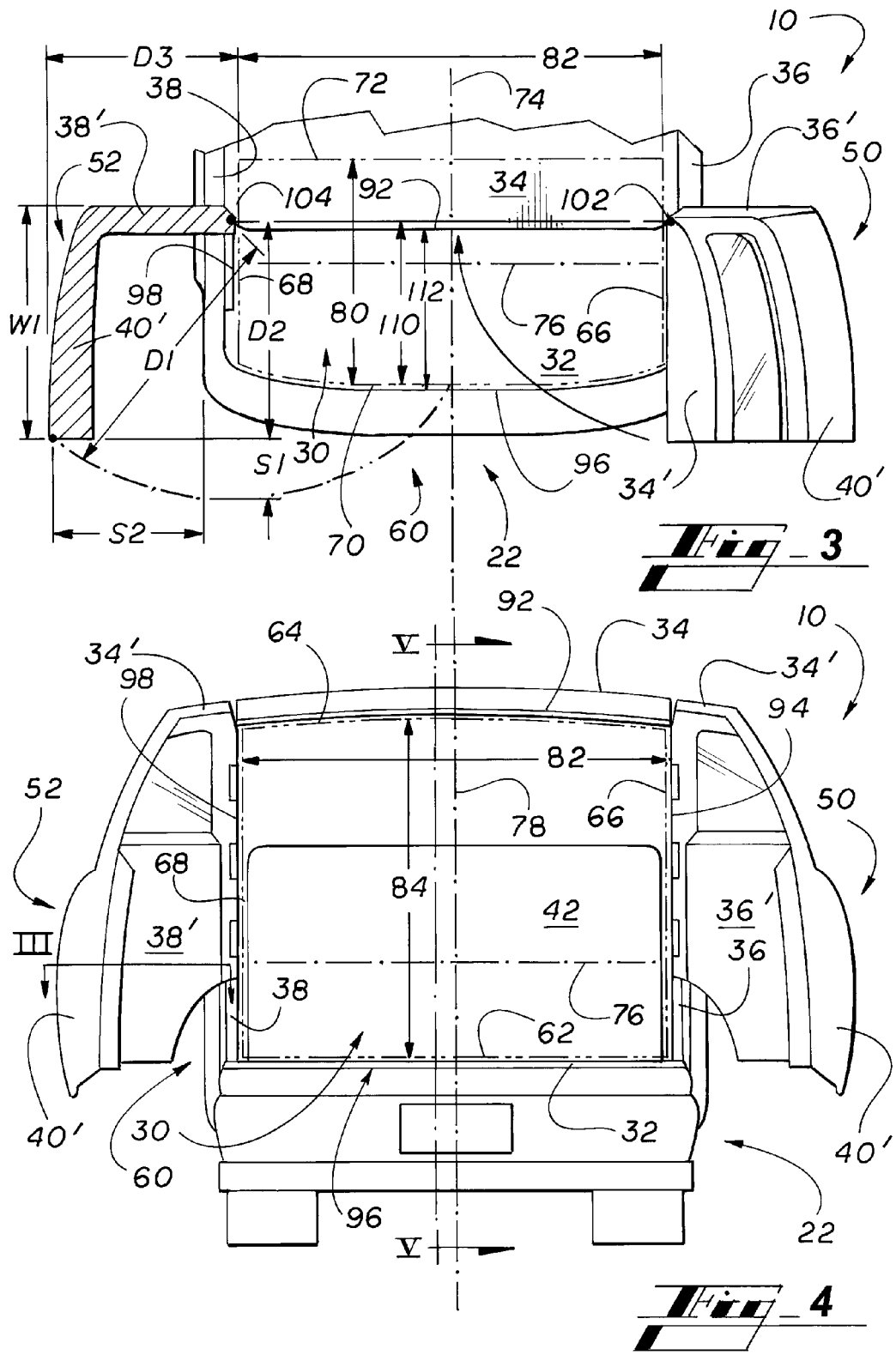

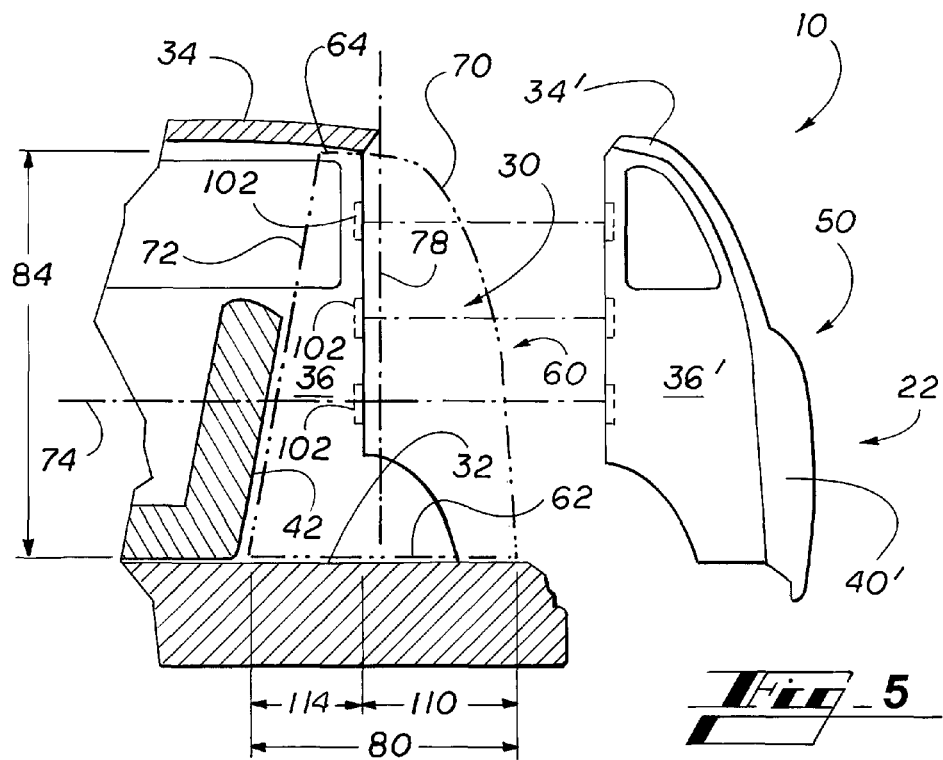
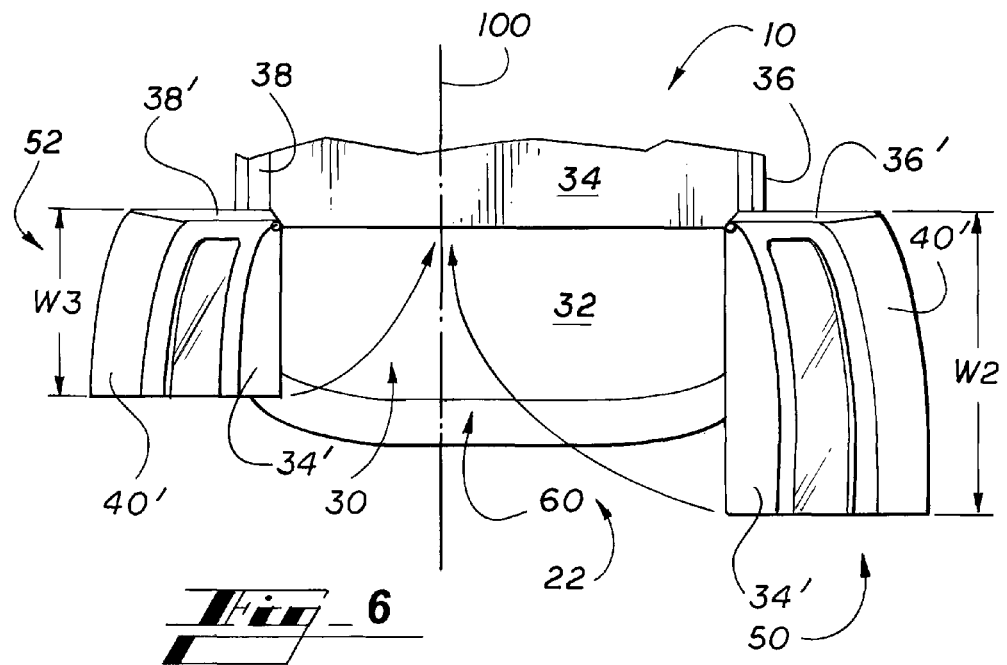

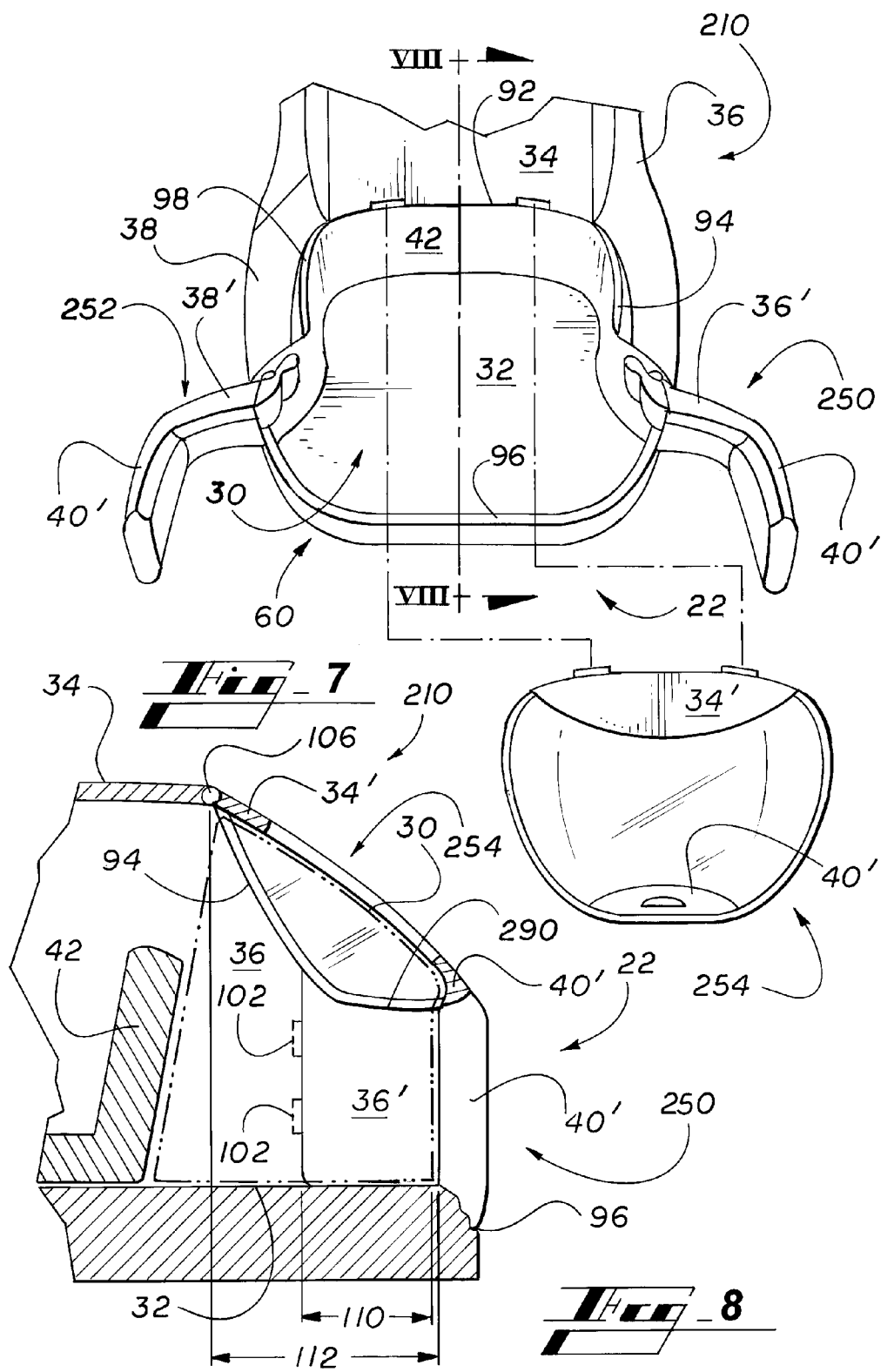

VEHICLE WITH DOORS FOR ACCESSING A STORAGE SPACE

TECHNICAL FIELD

The technical field is generally vehicles and, more specifically, vehicles with doors for accessing a storage space.

BACKGROUND

Storage spaces of certain vehicles are not configured to receive various objects and are difficult to load. For example, sport utility vehicles (SUVs) typically have an opening in the back end of the vehicle with dimensions that are less than the dimensions of the storage space. Such vehicles include a lip, bar, or other structure that obstructs maximum access to the storage space. As such, objects of a certain dimension that would fit in the storage space are obstructed by the size of the opening or obstructing structure. Further, the limited size of the opening restricts how objects can be loaded into the storage space as well as other utility of the storage space.

SUMMARY

The various embodiments of the present disclosure provide a vehicle with a door that defines an opening for easily accessing a storage space and that provides additional utility of the storage space. According to an exemplary embodiment, a vehicle includes a back door that is configured to provide an opening to a storage space. The back door includes a portion of a side wall and a portion of a back wall of the vehicle. A portion of the back door is vertically above a floor of the vehicle. According to certain embodiments, the back door includes a portion of a roof of the vehicle, which is vertically above the floor. In some embodiments, a portion of the back wall is vertically above the floor. The back door is hingedly connected to the side wall at a position that is offset from the back wall of the vehicle. In some embodiments, the offset distance between the side wall hinged connection and the back wall of the vehicle is at least fifty percent of the depth of the storage space.

Continuing with the exemplary embodiment, the opening is defined by an upper lateral edge and a lower lateral edge. The upper lateral edge is offset from the lower lateral edge by a longitudinal distance. In some embodiments, the longitudinal distance is at least fifty percent of the depth of the storage space. The height of the opening is substantially the maximum height of the storage space and the width of the opening is substantially the maximum width of the storage space.

In some two-door embodiments, back doors are hingedly connected to opposed sidewalls. In certain of these embodiments, one of the doors includes a larger portion of the back wall and the other of the doors includes a smaller portion of the back wall. For example, the larger portion of the back wall is substantially sixty percent of the back wall and the smaller portion of the back wall is substantially forty percent of the back wall.

According to a three-door embodiment, a vehicle includes a pair of back doors and a hatch door that provide access to an opening to a storage space. Each of the pair of back doors includes a portion of a side wall and a portion of a back wall and is hingedly connected to a respective opposed side wall of the vehicle at a position that is offset from the back end of the vehicle. The hatch door is hingedly connected to a roof of the vehicle. At least a portion of the hatch door is vertically above a floor of the vehicle and the hatch door is hingedly connected to the roof at a position that is offset from the back end of the vehicle.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments, the accompanying drawings, and the claims.

DESCRIPTION OF THE DRAWINGS

FIG. 3 is a partial plan view the vehicle of FIG. 1.

FIG. 4 is an end elevation view of the vehicle of FIG. 1.

FIG. 5 is a partial cross-sectional side elevation view of the vehicle of FIG. 1.

FIG. 6 is a partial cross-sectional plan view of a vehicle with back doors for accessing a storage space, according to another exemplary embodiment.

FIG. 7 is an exploded perspective view of a vehicle with back doors for accessing a storage space, according to another exemplary embodiment.

FIG. 8 is a partial cross-sectional side elevation view of the vehicle of FIG. 7.

DETAILED DESCRIPTION

Figure 1:
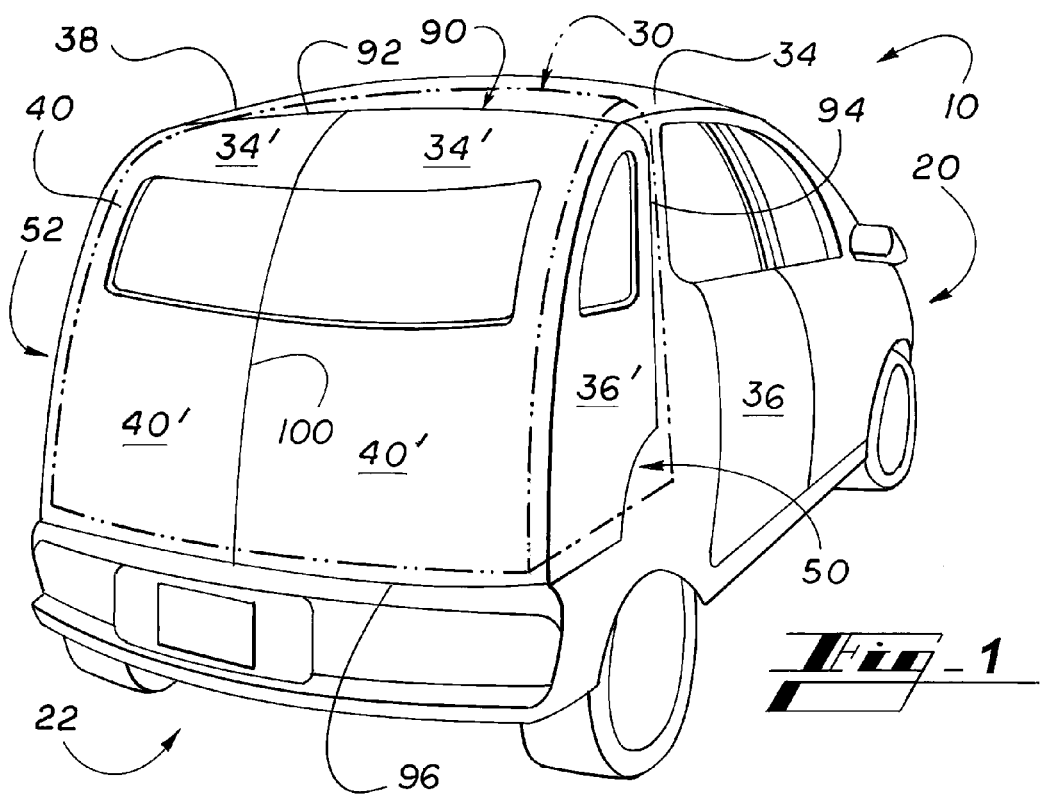
FIG. 1 is a perspective view of a vehicle with back doors for accessing a storage space, according to an exemplary embodiment.
Figure 2:
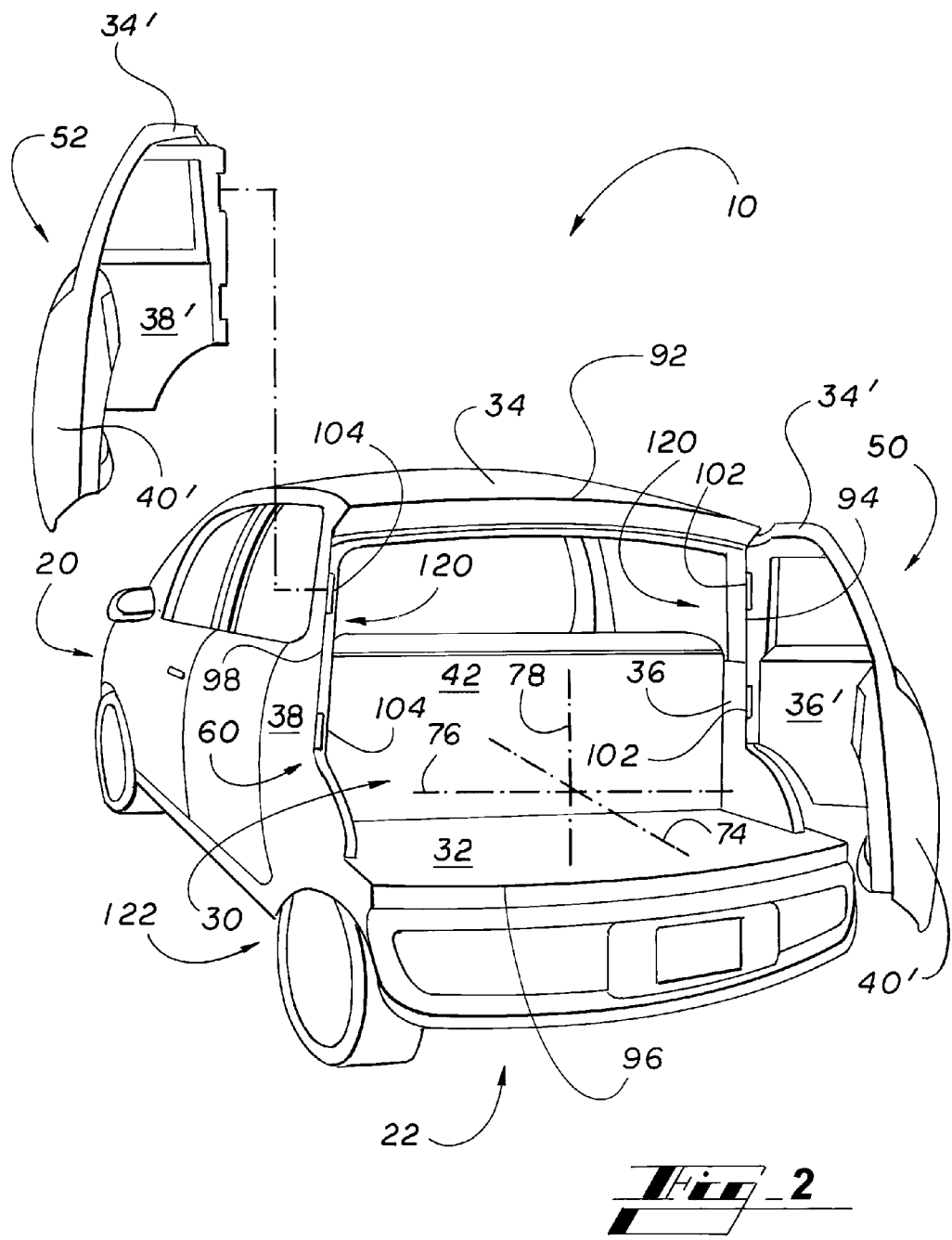
FIG. 2 is an exploded view of the vehicle of FIG. 1.

As required, detailed embodiments are disclosed herein. It must be understood that the disclosed embodiments are merely exemplary of various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Referring to FIGS. 1-5, a vehicle 10 includes a front end 20, a back end 22, walls that define a cabin of the vehicle 10, and a storage space 30 located in the cabin in a portion of the vehicle that is adjacent the back end 22. The walls include a floor 32, a roof 34, opposed side walls 36, 38, and a back wall 40. The storage space 30 is generally defined by the back wall 40 and back end portions of each of the floor 32, the roof 34, and the opposed side walls 36, 38. A front end of the storage space 30 is defined, for example, by a back seat 42. In the case of a vehicle with a fold-down back seat, the depth of the storage space is variable. The vehicle 10 further includes back doors 50, 52 located at the back end 22 that can be opened and closed to access or close-off access to the storage space 30. When the back doors 50, 52 are open, the storage space 30 is accessible through an opening 60. When the back doors 50, 52 are closed, the back doors 50, 52 close off the opening 60 such that the storage space 30 is not accessible from outside the vehicle 10.

For purposes of teaching, planes associated with the walls 32, 34, 36, 38, 40, 42 are defined. The floor 32 defines a floor plane 62, the roof 34 defines a roof plane 64, the side walls 36, 38 define side planes 66, 68, the back wall 40 defines a back plane 70, and the back seat 42 defines a front plane 72. The planes 62, 64, 66, 68, 70, 72 are defined to generally define the dimensions of the storage space 30 even when the back doors 50, 52 are open (e.g., parts of the walls are moved). Although the corresponding walls and seat are at times referred to with respect to these planes, the shapes of the relevant surface of the walls and seat are not limited to being strictly planar. Generally described, the opening 60 can be defined by parts of the planes that define the storage space 30 and that are exposed when one or both of the back doors 50, 52 are open.

Also, for purposes of teaching, a rectangular coordinate system is introduced. The coordinate system includes a longitudinal axis 74, a lateral axis 76, and a vertical axis 78 that are orthogonal to one another. Generally, the longitudinal axis 74 extends along a length of the vehicle 10 between the front end 20 and the back end 22, the lateral axis 76 extends along a width of the vehicle 10 between the side walls 36, 38, and the vertical axis 78 extends along a height of the vehicle 10 between the floor 32 and the roof 34.

Referring to FIGS. 3-5, the dimensions of the storage space 30 are now further described. A depth 80 of the storage space 30 is measured longitudinally, such as along the floor 32, from the back plane 70 to the front plane 72, a width 82 of the storage space 30 is measured laterally between the side planes 66, 68, and a height 84 of the storage space 30 is measured vertically between the floor plane 62 and the roof plane 64. As mentioned above, in the case of a fold-down back seat 42, the position of the front plane 72 is variable and thus the depth 80 can be controlled. For example, many vehicles have a third row of seating that can be folded up or down. Such vehicles can be configured to have smaller or larger storage spaces. In the case where the third row is up, the third row substantially defines the front plane 72 and, in the case where the third row is down, the second row substantially defines the front plane 72. In general, the rearmost seat 42 is configured to at least partially define the storage space 30.

As the storage space 30 is commonly not perfectly rectangular, such dimensions can vary and can be measured and analyzed differently. In general, the storage space 30 can be represented by a maximum dimension, a minimum dimension, an average dimension, a dimension at a particular location in the storage space, and the like. The dimensional terms such as depth, width, and height generally refer to the dimension between walls or planes.

The back doors 50, 52 and the opening 60 are configured to allow greater access to the storage space 30 as compared to conventional vehicle back doors, hatches, gates, and the like that allow access to a storage space. One way in which the opening 60 allows greater access is that the opening 60 does not limit the ability of the storage space 30 to receive objects. For example, the opening 60 is not defined by a bar, overhanging lip, or other structure that obstructs a clear path into and through a cross section of the storage space 30. Rather, as illustrated by a cross section of the storage space 30 in FIG. 4, the opening 60 enables access to substantially the maximum width 82 and maximum height 84 of the storage space 30. The storage space 30 can squarely receive objects having a width and a height up to substantially that of the storage space 30. For example, the storage space 30 can receive such objects without the need to orient the object in a particular manner to get the object through the opening 60. An example of such an object is a four foot by four foot piece of board that is squarely received to lie on the floor 32 in the storage space 30 where the width 82 is four feet.

Another way in which the opening 60 allows greater access is that the opening 60 allows direct access to part of the depth 80 of the storage space 30 through the side planes 66, 68 and the roof plane 64, which partially define the opening 60 as well as the storage space 30. Further, direct access through the side planes 66, 68 (see FIG. 4) and roof plane 64 (see FIG. 5) provide easy access to the part of the depth 80 of the storage, space 30 that is not directly accessible through the opening 60. For example, objects near the front plane 72 of the storage space 30 can be more easily accessed through the side planes 66, 68 of the opening 60, which are closer to the front plane 72 of the storage space 30 than the back plane 70. Further, access through the planes 64, 66, 68, facilitates loading and unloading of relatively large objects, such as when a user has one or both hands on a side of the object during loading/unloading. Generally described, the opening 60 is configured to allow access to the storage space 30 through more than one plane, wall, or direction.

Referring to FIGS. 1-5, the back doors 50, 52 are now described in more detail. In some embodiments, the back doors 50, 52 are substantially symmetric. For purposes of teaching, the first back door 50 is described in detail. The description of the first back door 50 is applicable to the second back door 52 for embodiments in which they are symmetric. The first back door 50 includes separable portions 40', 36', 34' of each of the back wall 40, the side wall 36, and the roof 34. Referring to FIG. 3, the separable side wall portion 36' and separable back wall portion 40' of the back door 50 form an L-shape, generally, when viewed in a plan view (see, for example, the cross-sectional view of the second back door 52 in FIG. 3).

Each separable portion 40', 36', 34' is separable from and is configured to connect to or abut the associated static portion of the wall 40, 36, 34 along an associated segment of a substantially continuous edge 90. In some embodiments, one or more of the separable portions 40', 36', 34' and the edge 90 are configured to form a seal when connected or abutted. Distal portions of the back doors 50, 52 are separable from one another along a distal edge 100 (shown in FIG. 1) that extends longitudinally and vertically across the back wall 40 between the floor 32 and the roof 34. The opening 60 is generally outlined by the edge 90 and further represented by parts of the planes 62, 64, 66, 68 that are exposed when the back doors 50, 52 are open. In instances where one of the back doors 50, 52 is open and the other closed, the opening 60 is generally outlined by part of the edge 90, the distal edge 100, and parts of the planes 62, 64, 66 or 68 that are exposed.

Referring to FIG. 1, the separable roof portion 34' is separable from the static portion of the roof 34 along a roof segment 92 of the edge 90, the separable side wall portion 36' is separable from the static portion of the side wall 36 along a side wall segment 94 of the edge 90, the separable back wall portion 40' is separable from the floor 32 along a back wall segment 96 of the edge 90, and the separable side wall portion 38' is separable from the static portion of the side wall 38 along a side wall segment 98 of the edge 90. Further described, the roof segment 92 extends laterally across the roof 34 between the side walls 36, 38, each side wall segment 94, 98 extends longitudinally and vertically across the respective side wall 36, 38 from the roof 34 to the floor 32, and the back wall segment 96 extends laterally between the side walls 36, 38 and is located along the intersection of the back wall 40 and the floor 32. The roof segment 92 (also generally referred to as an upper lateral edge) is displaced from the back wall segment 96 (also generally referred to as a lower lateral edge) in both the vertical direction and the longitudinal direction. The vertical distance between the segments 92, 96 is substantially the height 84 of the storage space 30 and the longitudinal distance is a distance 112. This displacement provides clearance above a portion of the floor 32 as described in further detail below. A distance 114, shown in FIG. 5, represents a longitudinal distance of the storage space 30 (e.g., of the floor 32) that is covered by the static roof portion 34.

Each back door 50, 52 is connected to the respective side wall 36, 38 by a hinge 102, 104 along the edge 90. In some embodiments, the hinges 102, 104 are positioned on a substantially vertical part of the side wall segment 94, 98 of the edge 90 or are otherwise configured such that the back doors 50, 52 swing open horizontally. Referring to FIGS. 3 and 5, the hinge 102, 104 (or the substantially vertical part of the side wall segment 94, 98) is positioned at a distance 110 from the back plane 70. The hinge 102, 104 is positioned adjacent a column 120 that supports the hinge 102, 104. In the illustrated embodiment, the hinge 102, 104 is substantially aligned with a wheel well 122.

In some embodiments, the distances 110, 112, are at least fifty percent of the depth 80 of the storage space 30. It is contemplated that the distances 110, 112 can be anywhere between one percent and one hundred percent of the depth 80.

In the embodiment illustrated in FIGS. 1-5, the separable roof portion 34' of the back doors 50, 52 is positioned vertically above the floor 32 when the back doors 50, 52 are closed and provides clearance above the associated portion of the floor 32 when the back doors 50, 52 are open. In certain other embodiments, the back end 22 is contoured such that the back wall 40 and the roof 34 are a substantially continuous structure or otherwise do not have a well-defined corner therebetween. Further, in certain embodiments, a portion of the vehicle 10 near the back end 22 is contoured such that the back wall 40, the side walls 36, 38, and the roof 34 are a substantially continuous structure or otherwise do not have well defined borders therebetween. In these embodiments, generally described, each back door 50, 52 includes a portion of a wall located vertically above the floor 32.

Referring to FIGS. 2-5, in addition to providing improved access to the storage space 30, the back doors 50, 52 provide additional utility of the storage space 30. Because the hinge points are markedly spaced from the back end 22 of the vehicle 10, the back doors 50, 52 need only a relatively small amount of space behind the back end 22 to open. Further, due to the L-shape of the back doors 50, 52, the doors only require a relatively small amount of space next to the vehicle 10 to open, as compared to conventional horizontally-swinging back doors. For example, referring to FIG. 3, a back space S1 behind the back end 22 that is required to fully open the back door 52 is approximately equal to the difference between a distance D1 and a distance D2. The distance D1 is measured between the hinge 102 and the distal end of the back door 52 and the distance D2 is measured from the hinge 102 to the back end 22. Further, a side space S2 to the side of the vehicle 10 is approximately equal to the distance D3 (width of sidewall portion 38'). The distance 110 can be selected to optimize the back space S1 and side space S2. In the illustrated embodiment, each of the back space S1 and the side space S2 are less than fifty percent of the distance D1 and a width W1 of the back wall portion 40'. For comparison, certain conventional back doors require a larger back and side space with each being approximately equal to the width of the door (e.g., width W1). As such, the back doors 50, 52 can have an opening space that is substantially smaller that that of conventional back doors.

When the back doors 50, 52 are open, they create a bounded space for work or play with clearance on the sides, to the back, and above a portion of the floor 32. As shown in FIG. 3, the space is bounded on the sides by the back doors 50, 52. As such, a back end 22 portion of the floor 32 has clearance to the sides, back, and above. The bounded space includes the covered portion of the floor 32 (represented by distance 114) that is positioned towards the front of the storage space 30 and the uncovered portion of the floor 32 (represented by distance 110). The bounded space has a width that is greater than the width of the vehicle 10 and includes the storage space 30. Such a space and configuration is useful for tailgating at sporting events, seating for drive-in movies, and utility as a workbench when fishing, hunting, camping, or working on radio-controlled cars, planes, boats, and the like.

Referring to FIG. 6, an alternative configuration of back doors 50, 52 is illustrated. Here, the back doors 50, 52 are asymmetrically divided along the distal edge 100 (represented by plane 100) such that the width W2 of the larger back door 50 is greater than the width W3 of the smaller back door 52. As such, the larger back door 50 includes a larger portion of the back wall 40 and the smaller back door 52 includes a smaller portion of the back wall 40. For example, the larger portion of the back wall 40 is substantially sixty percent of the back wall 40 and the smaller portion of the back wall 40 is substantially forty percent of the back wall 40.

The back doors 50, 52 open independent of each other. This configuration allows the user to create three different sized openings 60: a small opening 60 with only the smaller back door 52 open, a medium opening 60 with only the larger back door 50 open, and a large opening 60 with both back doors 50, 52 open. As such, the user has increased flexibility to select the appropriate size of opening 60 based on preference or application. When using only the smaller back door 52, due to the hinge position at which the smaller back door 52 is connected to the static side wall 38 of the vehicle 10 and the shape of the smaller back door 52, even less space behind and next to the vehicle 10 is required to access the storage space 30. This is helpful when the user wishes to access the storage space 30 and an obstacle such as a wall, pillar, or other vehicle is closely behind or next to the vehicle 10.

Referring to FIGS. 7 and 8, a vehicle 210 that includes three back doors is illustrated. In general, the vehicle 210 is substantially similar to the vehicle 10 described in connection with FIGS. 1-6 and, for simplicity, the description of the vehicle 210 will focus on back doors 250, 252, 254. Each of the laterally-opening back doors 250, 252 includes a side wall portion 36', 38' and a back wall portion 40' and is hingedly connected to the side wall 36, 38 along a side wall segment 94, 98 of edge 90 (e.g., a substantially vertical portion) that is offset from the back end 22 by a distance 110. The hatch door 254 is hingedly connected to the roof 34 (hinge 106) along a substantially horizontal portion of edge 90 (roof segment 92) that is offset from the back wall segment 96 by a distance 112. Further, the hatch door 254 connects, and in some embodiments seals, to the back doors 250, 252 along edges (edge 290 shown for back door 250) and is vertically above a portion of the floor 32. The laterally-opening back doors 250, 252 provide access to the storage space 30 along the sides and back of the vehicle 210 and the hatch door 254 provides access to the storage space 30 along the side, back, and roof of the vehicle 210.

For purposes of illustration, the planes are shown slightly offset from the walls and edges. However, the planes are substantially defined by the walls and edges without a distance therebetween. As such, measurements and dimensions that are defined with respect to walls, planes, and edges can be alternatively defined by any other of applicable walls, planes, and edges.

The above-described embodiments are merely exemplary illustrations of implementations that are set forth for a clear understanding of principles. Variations, modifications, and combinations may be made to the above-described embodiments may be made without departing from the scope of the claims. All such variations, modifications, and combinations are included herein by the scope of this disclosure and the following claims.

What is claimed is:

1. A vehicle, comprising:
   a plurality of walls comprising a roof, a floor, a first side wall, and a second side wall, wherein the first side wall is opposite the second side wall and the roof is opposite the floor; and
   a first back door that is hingedly connected to the first side wall at a first hinged connection, the first back door comprising:
      a first side wall portion that further defines the first side wall when the first back door is in a closed position; and
      a first back wall portion that at least partially defines a back wall when the first back door is in the closed position;
   wherein the first back door is configured to, when in an open position, expose at least part of an opening to a storage space of the vehicle, wherein the storage space is:
      at least partially defined by the roof, the floor, the first side wall, the second side wall, and the first back door when the first back door is in the closed position; and
      adjacent a back end of the vehicle;
   wherein the opening is defined at least in part by an upper lateral edge of the roof and a lower lateral edge of the floor, the upper lateral edge and the lower lateral edge each being rear-most edges with respect to the roof and the floor and each extending in a direction that is substantially perpendicular to each of the first side wall and the second side wall, the upper lateral edge being offset from the lower lateral edge by a longitudinal distance, the longitudinal distance being measured in a direction that is longitudinal with respect to a front end and the back end of the vehicle; and
   wherein the first hinged connection is offset from the lower lateral edge of the floor by a first offset distance, the first offset distance being measured in a direction that is longitudinal with respect to the front end and the back end of the vehicle.

2. The vehicle of claim 1, wherein the first offset distance is at least ten percent of a depth of the storage space, the depth of the storage space being measured in a direction that is longitudinal with respect to the front end and the back end of the vehicle.

3. The vehicle of claim 1, wherein the first offset distance is at least fifty percent of a depth of the storage space, the depth of the storage space being measured in a direction that is longitudinal with respect to the front end and the back end of the vehicle.

4. The vehicle of claim 1, wherein the first back door further comprises a first roof portion that further defines the roof when the first back door is in the closed position.

5. The vehicle of claim 1, wherein the first back wall portion is angled towards the front of the vehicle so as to be positioned vertically above the floor when the first back door is in the closed position.

6. The vehicle of claim 1, wherein the longitudinal distance is at least ten percent of a depth of the storage space, the depth of the storage space being measured in a direction that is longitudinal with respect to the front end and the back end of the vehicle.

7. The vehicle of claim 1, wherein the first side wall portion and the first back wall portion are generally perpendicular to one another.

8. The vehicle of claim 1, wherein a height of the opening is substantially a maximum height of the storage space.

9. The vehicle of claim 8, wherein a width of the opening is substantially a maximum width of the storage space.

10. The vehicle of claim 1, further comprising a second back door that is hingedly connected to the second side wall at a second hinged connection, the second back door comprising:
    a second side wall portion that further defines the second side wall when the second back door is in a closed position; and
    a second back wall portion that at least partially defines the back wall when the second back door is in the closed position;
    wherein the second back door is configured to, when in an open position, expose at least part of the opening to the storage space, wherein the storage space is further at least partially defined by the second back door when the second back door is in the closed position; and
    wherein the second hinged connection is offset from the lower lateral edge by a second offset distance, the second offset distance being measured in a direction that is longitudinal with respect to the front end and the back end of the vehicle.

11. The vehicle of claim 10, wherein the first back wall portion is lamer than the second back wall portion.

12. The vehicle of claim 11, wherein the first back wall portion is substantially sixty percent of the back wall and the second back wall portion is substantially forty percent of the back wall.

13. The vehicle of claim 10, wherein the first back door and the second back door are configured to provide a bounded space there between when the first back door and the second back door are each in the open position, the bounded space having a width measured between the first back wall portion and the second back wall portion that is greater than the width of the vehicle.

14. The vehicle of claim 12, wherein the bounded space includes a portion of the floor with open space on opposite sides of, above, and to the back of the portion of the floor.

15. The vehicle of claim 1, wherein the longitudinal distance is at least fifty percent of a depth of the storage space.

16. The vehicle of claim 10, further comprising a hatch door that is hingedly connected to the roof at the upper lateral edge, wherein the hatch door is configured to, in an open position, expose at least part of the opening to the storage space.

17. The vehicle of claim 10, wherein the first back door and the second back door are configured to, each in an open position, fully expose the opening of the storage space.

18. The vehicle of claim 10, wherein each of the first offset distance and the second offset distance is at least ten percent of a depth of the storage space, the depth of the storage space being measured in a direction that is longitudinal with respect to the front end and the back end of the vehicle.

19. The vehicle of claim 10, wherein the first back door further comprises a first roof portion and the second back door further comprises a second roof portion, wherein each of the first roof portion and the second roof portion further defines the roof a respective one of the first back door and the second back door is in the closed position.

20. The vehicle of claim 10, wherein each of the first back wall portion and the second back wall portion is angled towards the front of the vehicle so as to be positioned vertically above the floor when a respective one of the first back door and the second back door is in the closed position.

\* \* \* \* \*